United States Patent [19]
Bray

[11] 3,794,173
[45] Feb. 26, 1974

[54] VALVE FOR REVERSE OSMOSIS PURIFICATION AND STORAGE SYSTEM
[75] Inventor: Donald T. Bray, San Diego, Calif.
[73] Assignee: Desalination Systems, Inc., Escondido, Calif.
[22] Filed: Oct. 4, 1972
[21] Appl. No.: 294,965

Related U.S. Application Data
[63] Continuation-in-part of Ser. No. 284,489, Aug. 29, 1972.

[52] U.S. Cl.................. 210/257, 210/321, 210/433
[51] Int. Cl............................................. B01d 31/00
[58] Field of Search ............ 210/321, 257, 258, 433

[56] References Cited
UNITED STATES PATENTS
3,679,055   7/1972   Wark et al...................... 210/258 X Primary Examiner—Frank A. Spear, Jr.
Attorney, Agent, or Firm—Clement H. Allen

[57] ABSTRACT

A valve for a water purification system operating by reverse osmosis which combines the functions of a pressure control for the blowdown or brine from the reverse osmosis module, and of a pressure control for a purified water container; and also acts as a pressure responsive valve to allow elevated pressure impure water to flow into the purified water container to elevate the pressure of purified water supplied to a dispensing valve when the dispensing valve is opened.

5 Claims, 4 Drawing Figures

PATENTED FEB 26 1974　　3,794,173

VALVE FOR REVERSE OSMOSIS PURIFICATION AND STORAGE SYSTEM

CROSS REFERENCE

This application is a continuation-in-part of my copending application Ser. No. 284,489 filed Aug. 29, 1972.

BACKGROUND OF THE INVENTION

1. Field of the Invention

This invention relates to a combination valve for controlling water storage pressure conditions and module operating pressure in a reverse osmosis purification and water storage system.

2. The Prior Art

Various types of apparatus for storing purified water produced by a reverse osmosis system have been proposed and used by the prior art, for example those shown in U.S. Pat. Nos. 3,493,496; 3,568,843; and 3,616,921. These arrangements are useful under many conditions but do not provide water storage under relatively low pressure with an accompanying capability for delivery of purified water on demand at a relatively high or elevated pressure.

It is important to preserve the highest possible pressure drop across the reverse osmosis module so that greatest membrane operating efficiency is maintained; at the same time water for delivery to a dispensing valve or point of use must be at an elevated pressure since the valve or faucet location may be remote from the purification unit and ample pressure will be required to provide desired flow to the outflow point. Thus for a household reverse osmosis system with a water storage facility, the purified water pressure in the storage container should normally not be more than slightly above atmospheric, preferably 10 psig or so, since more than this will reduce the pressure drop across the reverse osmosis module (the difference between the input household line feed pressure of the order of 40–100 psig and the purified water storage pressure) and result in seriously lowered purification efficiency and output. While the normal water storage pressure should for this reason be low, output pressure from the storage tank should be sufficiently elevated to provide adequate water flow through the delivery or transfer pipe system to a dispensing valve when this valve is opened, and this pressure may advantageously be of the order of 40 to 100 psig more or less.

Operation of previously proposed purified water storage arrangements has generally resulted in a gradual increase in stored water pressure as purified water has been produced by the reverse osmosis unit and stored in a container. As the pressure of the stored water rises, the efficiency of the reverse osmosis unit decreases because of decreased pressure drop across the membrane as explained above. Operation of apparatus according to this invention, however, will result in efficient storage of purified water at no more than slightly above atmospheric pressure, thus preserving a high pressure drop across the reverse osmosis module for best operating efficiency; while at the same time making purified water available on demand from the storage container at an elevated pressure of the order of the original feed line pressure.

SUMMARY OF THE INVENTION

My copending patent application Ser. No. 284,489 filed Aug. 29, 1972 of which this application is a continuation-in-part, describes and claims a water storage and dispensing apparatus for a reverse osmosis water purification system. Such apparatus includes a storage container for purified water normally maintained at slightly higher than atmospheric pressure connected to a dispensing valve. When the dispensing valve is opened a pressure responsive valve, such as a diaphragm valve, is automatically actuated to supply impure water under elevated pressure, which may be of the order of conventional household line pressure, to the storage container, thus pressurizing the purified water therein for delivery to the dispensing valve or point of use. This type of water purification, storage and dispensing apparatus works well under many conditions. It does however require, in addition to the pressure responsive valve, a blowdown back pressure valve or restricted passageway flow control to maintain operating pressure in the reverse osmosis module, and also a back pressure valve or restricted passageway flow control to maintain the slightly above atmospheric pressure at which the purified water is normally stored in the storage container. These separate valves or flow control devices are expensive, and often, especially in the case of the blowdown control device for maintaining operating pressure in the reverse osmosis module, may be occasionally unreliable in operation due to plugging or partial plugging of relatively small diameter flow control channels with particulate matter or foreign material.

Summarized briefly the apparatus of this invention provides a unitary valve structure in which all three valves or flow control devices are combined, and in which possible plugging of the principal blowdown control device is eliminated or substantially reduced. The apparatus includes means for controlling the pressure of purified water in a storage container, and for controlling the back pressure of brine or blowdown from a reverse osmosis unit or module employed to produce such purified water, and also for controlling, by pressure responsive means, introduction of impure water at elevated pressure into the storage container to pressurize the purified water in said container for delivery to a dispensing valve when the dispensing valve is opened. This is accomplished by provision of a body having a first cavity divided by a flexible diaphragm into a pair of chambers, with a plunger assembly on one side of said diaphragm actuated by pressure on the other side of the diaphragm. The plunger opens and closes a port in a second cavity in the valve body to control flow of impure water (which may include brine or blowdown from the reverse osmosis module) into the storage container when the dispensing valve is opened, and also controls flow of brine or blowdown to disposal means through a restricted passageway in or associated with the plunger, this restricted passageway also being connected to the storage container to maintain and control the storage pressure of purified water contained therein.

BRIEF DESCRIPTION OF THE DRAWINGS

Construction and operation of the apparatus of this invention will be more readily understood by reference to the detailed description thereof and to the annexed drawings in which.

DESCRIPTION OF A PREFERRED EMBODIMENT

Figure 1:
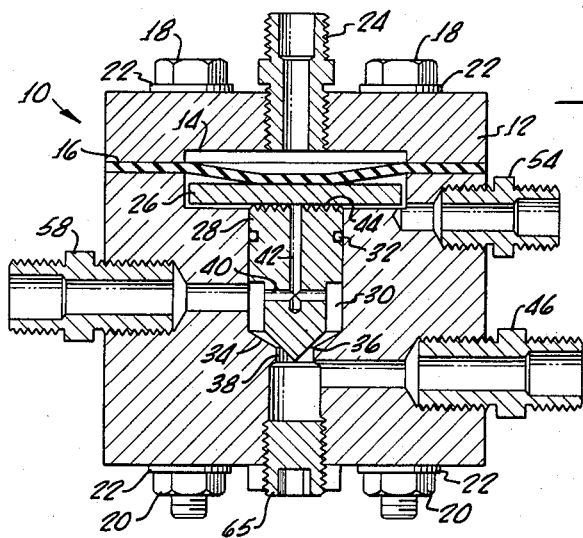
FIG. 1 shows a central vertical section of a valve embodying features of this invention.
Figure 3:
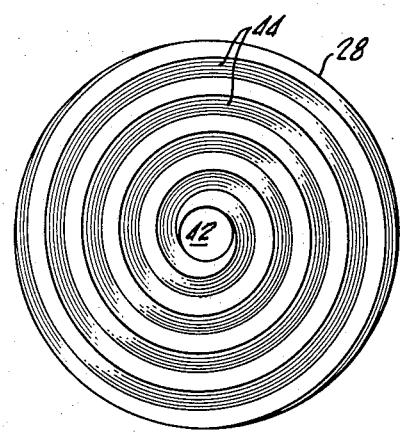
FIG. 3 shows enlarged, a top view of the restricted passageway for flow control associated with the diaphragm actuated plunger in the valve of FIG. 1.
Figure 2:
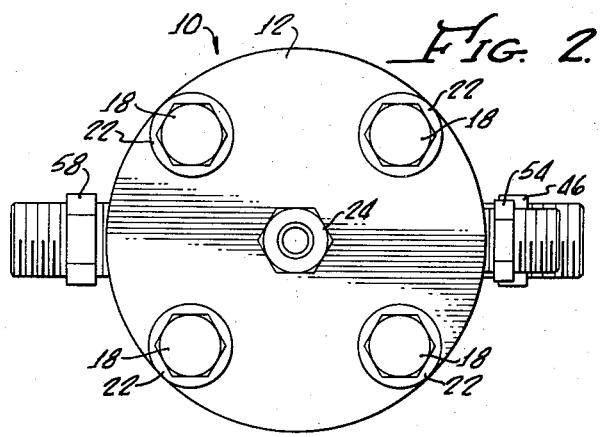
FIG. 2 shows a top view of the valve of FIG. 1.

Referring now to FIGS. 1, 2 and 3, the unitary valve 10 comprises a body 12 in which a first or upper cavity 14 is formed as shown by aligned cavity sections in separate top and bottom portions of body 12. Flexible diaphragm 16 divides cavity 14 into an upper chamber and a lower chamber as shown, the outer edges of flexible diaphragm 16 being sealed to the side walls of cavity 14 by insertion between the top and bottom portions of body 12, which portions, together with the interposed diaphragm 16 are maintained in tight sealed relationship by through bolts 18 and nuts 20 with conventional washers 22.

At the top of valve body 12 is arranged a connector 24 which communicates interiorly with the top chamber of cavity 14 and which is adapted to receive a connection from the purified water outlet of a reverse osmosis module which supplies purified water to a dispensing valve, as will be hereinafter described in more detail, so that pressure in this line or connection will be transmitted to the top surface of flexible diaphragm 16.

Also in cavity 14, in the bottom chamber thereof and normally contacting the underside of flexible diaphragm 16 is pressure plate 26 which provides a floating plane lower surface for contact with the upper surface of plunger 28 which rides up and down in a cylindrical second cavity 30, being sealed to the walls thereof by "O" ring seal 32. The bottom of cavity 30 is formed with a tapered seat 34 and shoulder 36 which is formed as a part of port 38 with which it communicates. The bottom of plunger is tapered as shown so that its up and down movement will provide a needle valve control effect between it and the shoulder 36 of port 38 with which it mates and can seat.

Plunger 28 is substantially formed with a transverse channel 40 which communicates interiorly with vertical channel 42 which is closed at its bottom but is open at its top communicating with the central whorl or innermost convolution of a spiral groove 44 in its top surface. This spiral groove in the top of plunger 28 is illustrated in the enlarged view shown in FIG. 3. When the top of plunger 28 is abuts against the under surface of pressure plate 26, as shown in FIG. 1, the spiral groove in the top of plunger 28 becomes closed along its top to form an elongated spiral passageway which is of appropriately small cross section to provide a restricted passageway for flow control purposes.

A connector 46 is arranged in body 12 communicating with the port 38 in the second or lower cavity 30 therein, this communication being as shown below the shoulder 36. Connector 46 will be connected by a suitable pipe line 48 to the blowdown or brine outlet 50 of a reverse osmosis module 52 as will be seen in FIG. 4. Another connector 54 in body 12 will be connected by a suitable pipe line 56 to brine disposal means such as waste or sewer, and communicates within body 12 with the bottom chamber of cavity 14. Yet another connector 58 in body 12 communicates with the second cavity 30 therein above the seat 34 as shown and will be connected by a suitable pipe line 60 to the interior of purified water storage container 62, the input being fitted with a turbulence reducing baffle 64 for reasons discussed hereinafter. Valve body 12 may additionally be provided with a removable bottom clean-out plug as at 65. Also as will be seen in FIG. 4, feed water inlet 66 in reverse osmosis module 52 is connected to a source of feed water, which may be a municipal main or other source of relatively impure water, by a suitable pipe line 68. The purified water from outlet 70 of module 52 flows through a system including a suitable pipe line 72 to dispensing valve 74 and a connecting pipe line 76 connects this line with the control diaphragm 16 through connector 24 in body 12. A connecting pipe line 78 connects line 72 with the top of storage container 62. Preferably pipe line 76 is connected to the purified water system at a point close to dispensing valve 74.

The purified water produced by module 52 is separated from impure water introduced also into container 62 by a pressure transmitting diaphragm or separator, for example by a gradient barrier as at 80. This barrier comprises a narrow layer through which the two types of water diffuse very slowly, the lighter purified water having lower salt content, floating on top of the heavier impure water introduced at a low position in container 52 through pipe 60 and diffuser 64 which prevents undesirable turbulence. If desired a heater such as at 82 may be arranged to slightly heat the purified water entering the top of container 62 to insure a greater difference in density and a more sharply defined and stable barrier layer, all as described and claimed in my copending patent application Ser. No. 139,563 filed May 3, 1971.

Figure 4:
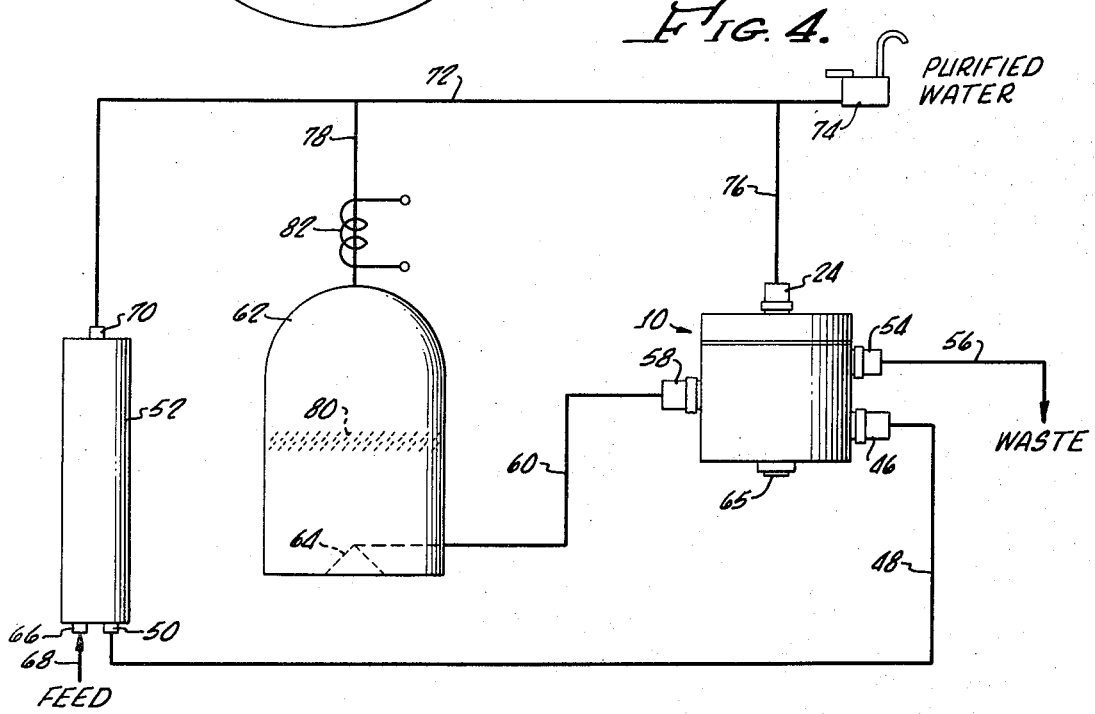
FIG. 4 shows connection of a valve according to this invention in a reverse osmosis water purification and storage system.

In operation, the valve of this invention will be connected to function as described, for example as shown in FIG. 4. When valve 72 is opened to dispense purified water the resulting lowered pressure in line 76 will cause diaphragm 16 in valve 10 to lift, thus allowing pressure plate 26 and plunger 28 to lift and this allows elevated pressure impure water, introduced into valve 10 through connector 46 from blowdown connector 50 of module 52 and originating in feed supply 68, to flow into the bottom of container 62 thus pressurizing the purified water in the container and the output from valve 74. When purified water is not being dispensed through valve 74, the blowdown or brine from module 52 flows into valve 10 through connector 46 through port 38, past shoulder 36, thus lifting plunger 28 slightly, then into lower cavity 30 in valve body 12, through channels 40 and 42, then through the restricted passageway formed by spiral groove 44 in the top of plunger 28 and the contiguous under surface of pressure plate 26 and finally out through connector 54. The passage between shoulder 36 and the tapered end of plunger 28 could be considered a primary flow control in the form of a restricted passageway for blowdown or brine entering through connector 46 and the spiral groove 44 could be considered a secondary flow control. The spiral groove 44 also acts as the pressure control for purified water in container 62 since a small bleed-off through spiral groove 44 is needed to accommodate the purified water entering the top of container 62. The spiral groove 44 is so sized that this flow plus the primary blowdown flow results in a pressure between the primary and secondary flow control that is slightly above atmospheric. It will be understood that the much greater volume of blowdown or brine passing through both of the flow control systems of the valve will result in maintenance of a suitably high or elevated pressure in reverse osmosis module 52, while the same spiral groove will maintain a pressure of liquid in container 62 only slightly above atmospheric, when no purified water is being obtained from dispensing valve 74.

Primary control of blowdown or brine pressure by flow between shoulder 36 in port 38 and the adjacent tapered surface of plunger 28 can be basically or initially adjusted by providing an area ratio between the cross section area of plunger 28 and the area of diaphragm 16 in cavity 14. For example, in a preferred embodiment, the cross section area of plunger 28 may be about one tenth of the area of diaphragm 16 contacted by the liquid in line 76 through connector 24 and the pressures on these two surfaces will be in similar, though inverse, proportion, that is the pressure on plunger 28 will be 10 times the pressure on top of diaphragm 16. Thus the pressure in purified water storage container 62 will be maintained at about 10 percent of the feed line pressure except, of course when dispensing valve 74 is opened. Plunger 28 will float and the space between its tapered bottom and shoulder 36 will vary to automatically let more or less liquid flow by to maintain the predetermined pressure ratio.

The apparatus of this invention is useful to provide a simple reliable and relatively inexpensive combination valve in which all three functions of blowdown control, storage container pressure control and purified output water pressure control can be obtained. The pressure ratio between the purified water storage and the module blowdown can be pre-set at a desired value. The primary blowdown control comprising a tapered plug seating in a shoulder is less likely to plug since if any obstruction occurs the plug lifts further off the seat in response to pressure build up and either controls as before, or allows the flow to wash through any free particulate matter or loose slime.

I claim:

1. In a water purification system in which purified water from a reverse osmosis module is stored in a container at relatively low pressure and, when a dispensing valve connected to said container is opened, impure water is introduced into said container to pressurize said purified water therein for delivery to said dispensing valve, the improvement which comprises; a unitary valve for controlling the release of blowdown from said reverse osmosis module, for controlling the normal low pressure in said container, and for controlling introduction of impure water into said container, said unitary valve comprising:
   a. a body;
   b. a flexible diaphragm dividing a first cavity in said body into a pair of chambers, said diaphragm being sealed to the sidewalls of said cavity;
   c. a connector, for connection with the system supplying purified water to said dispensing valve, communicating with one of said chambers in said first cavity in said body;
   d. a connector, for blowdown disposal from said reverse osmosis module, communicating with the other of said chambers in said first cavity in said body;
   e. a plunger actuated by said flexible diaphragm, the bottom of said plunger mating with a port in a second cavity in said body;
   f. a connector, for connection with an impure water supply, communicating with said port in said second cavity in said body; and,
   g. a connector, for connection with said container, communicating with the said second cavity in said body and communicating thereby with said connection for blowdown disposal through a restricted passageway associated with said plunger and leading to said first cavity in said body.

2. A valve according to claim 1 in which the cross section area of said plunger is a small fraction of the area of said flexible diaphragm.

3. A valve according to claim 1 in which the cross section area of said plunger is about one-tenth the area of said flexible diaphragm.

4. A valve according to claim 1 in which the top surface of said plunger has a spiral groove in its top surface which abuts against the under surface of a pressure plate, which abuts against the under side of said flexible diaphragm, to form an elongated restricted passageway.

5. A valve according to claim 1 in which the bottom of said plunger is tapered to mate with a shoulder in the sidewall of a port communicating with said second cavity in said body.

* * * * *